Aug. 26, 1930.   T. ST.J. B. PARNALL   1,774,038
LEVER SYSTEM PARTICULARLY APPLICABLE TO WEIGHING APPARATUS
Filed Aug. 23, 1928
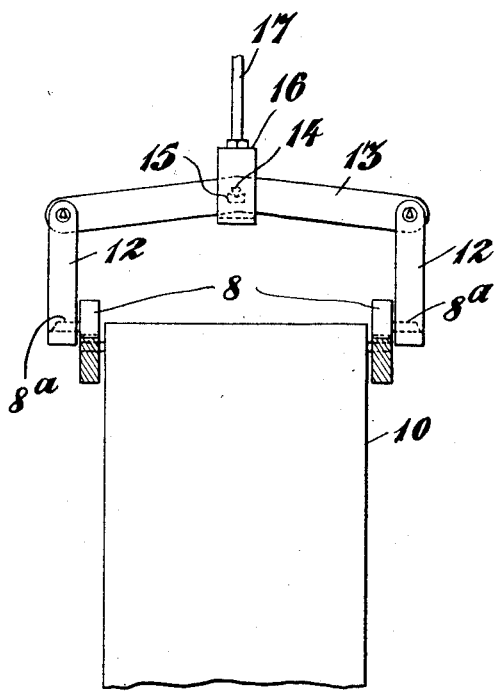
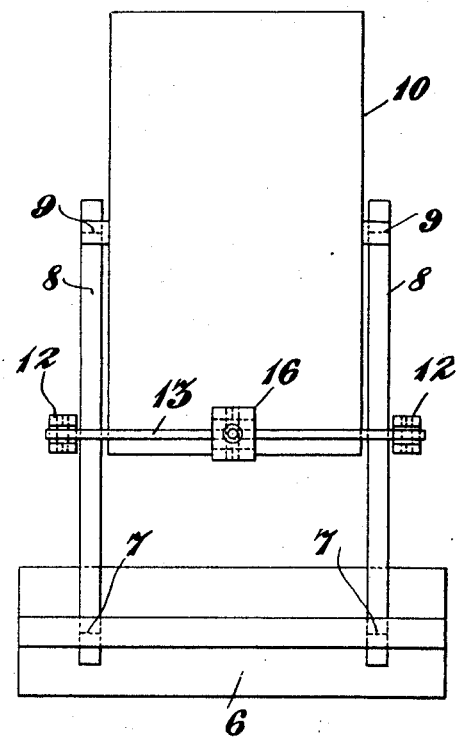
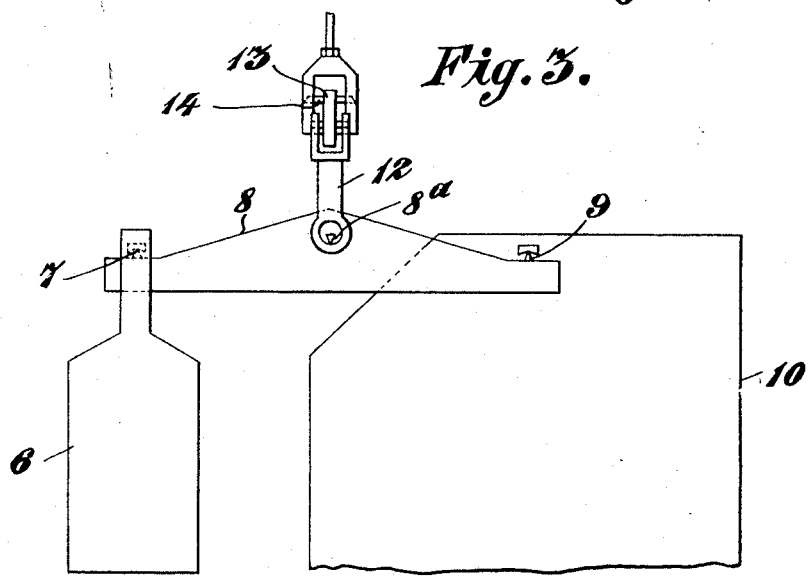

Patented Aug. 26, 1930

1,774,038

UNITED STATES PATENT OFFICE

THOMAS ST. JULIAN BABINGTON PARNALL, OF WESTOM-SUPER-MARE, ENGLAND

LEVER SYSTEM PARTICULARLY APPLICABLE TO WEIGHING APPARATUS

Application filed August 23, 1928, Serial No. 301,469, and in Great Britain August 30, 1927.

This invention has reference to improvements in or relating to lever systems particularly applicable to weighing apparatus.

In connection with weighing apparatus having a weighbeam or one or more levers which are provided with a pair or pairs of separate fulcrum knife-edges it is desirable that the said knife-edges should be located in the same horizontal plane when mounted in or on their bearings and it will be appreciated that considerable skill and labour may be entailed in effecting the requisite setting of the said fulcrum knife-edges.

The present invention has for its object the provision of an improved means whereby it is ensured that the aforesaid fulcrum knife-edges may automatically position themselves in a horizontal plane and maintain themselves in the said plane during a weighing operation.

The invention consists of an improved lever system particularly applicable to weighing apparatus wherein the separate fulcrum knife-edges or bearings of a weighbeam or lever or levers are supported from the opposite ends of a pivoted auxiliary lever or levers disposed at right angles to the aforesaid weighbeam or lever or levers whereby the auxiliary lever or levers may be oscillated to position and to maintain automatically the aforesaid fulcrum knife-edges or bearings in the same horizontal plane.

The invention will now be described with particular reference to the accompanying sheet of drawings which illustrate, somewhat diagrammatically, the application of the invention to an automatic weighing machine of known construction.

Figure 1 is a part sectional end view of an automatic weighing machine of known kind, having the weighbeam supported in accordance with the invention.

Figure 2 is a plan of the weighing machine illustrated in Figure 1, and

Figure 3 is a side elevation of the machine seen in Figure 1.

The automatic weighing machine illustrated in the drawings is of the known kind wherein a weight box 6 is suspended from knife-edges 7 carried at the ends of an even armed duplex weighbeam 8, the other end whereof is provided with knife-edges 9 which serve to support a hopper 10.

The fulcrum knife-edges $8^a$ of the weighbeam 8 are mounted in bearing blocks carried at the lower ends of a pair of links 12 which have a pivotal connection at their upper ends to the opposite ends of an even armed lever 13 disposed in a plane at right angles to the weighbeam 8. The aforesaid lever 13 is fulcrumed on knife-edges 14 supported in bearings 15 carried by a shackle 16 adapted to be suspended by means of a hook 17 from a fixed support or from a lever.

It will be seen that as the bearings 11 for the fulcrum knife-edges $8^a$ of the weighbeam are carried by the lever 13 the weighbeam is permitted an oscillating movement along a transverse axis and which admits of the said fulcrum knife-edges $8^a$ automatically aligning themselves in a horizontal plane.

Although the invention has been described in its application to the weighbeam of an automatic weighing machine, it will be appreciated that the invention is equally applicable to other forms of weighing apparatus wherein the weighbeam or lever is provided with a pair of separate knife-edges which it is desired should always be maintained in the same horizontal plane.

What I claim is:—

1. A lever system particularly applicable to weighing apparatus embodying a weighing lever, separate fulcrum bearings for said lever, an auxiliary lever adapted to oscillate in a plane at right angles to the said weighing lever and bearings carried by the auxiliary lever for supporting the fulcrum bearings of the weighing lever whereby the oscillation permitted to the auxiliary lever admits of the fulcrum bearings locating themselves automatically in the same horizontal plane.

2. A lever system particularly applicable to weighing apparatus embodying a weighing lever, a pair of separate fulcrum knife-edges for said lever, an even armed auxiliary lever adapted to oscillate in a plane at right angles to the weighing lever and bearings carried from opposite arms of the auxiliary lever for supporting the fulcrum bearings of the weighing lever whereby the oscillation permitted to the auxiliary lever admits of the fulcrum bearings locating themselves automatically in the same horizontal plane.

3. A lever system particularly applicable to weighing apparatus, embodying a weighing lever, separate fulcrum knife-edges for said lever, an even armed freely suspended auxiliary lever adapted to oscillate in a plane at right engles to the weighing lever and bearings carried from opposite arms of the auxiliary lever for supporting the fulcrum bearings of the weighing lever whereby the oscillation permitted to the auxiliary lever admits of the fulcrum bearings locating themselves automatically in the same horizontal plane.

In testimony whereof I have signed my name to this specification.

THOMAS ST. JULIAN BABINGTON PARNALL.